United States Patent [19]
Troll et al.

[11] 3,752,582
[45] Aug. 14, 1973

[54] OPTICAL RANGE AND RANGE-RATE SENSOR

[75] Inventors: William C. Troll, Rochester; Richard L. Fowler, Royal Oak, both of Mich.

[73] Assignee: The Bendix Corporation, Southfield, Mich.

[22] Filed: Jan. 27, 1971

[21] Appl. No.: 110,222

[52] U.S. Cl............................ 356/5, 356/28, 343/9, 343/12
[51] Int. Cl............................................. G01c 3/08
[58] Field of Search.................. 356/4, 5, 28; 343/9, 343/12, 13

[56] References Cited
UNITED STATES PATENTS

| | | | |
|---|---|---|---|
| 3,606,537 | 9/1971 | Yurasek et al............... | 356/5 |
| 2,966,090 | 12/1960 | Scholdstrom................. | 356/5 |
| 3,152,326 | 10/1964 | Merlo........................... | 343/9 X |
| 3,428,815 | 2/1969 | Thompson..................... | 356/5 |
| 3,574,461 | 4/1971 | Yurasek et al................. | 356/5 |
| 3,630,616 | 12/1971 | Everest........................ | 356/4 |

Primary Examiner—Benjamin A. Borchelt
Assistant Examiner—S. C. Buczinski

Attorney—Lester L. Hallacher and Plante, Hartz, Smith & Thompson

[57] ABSTRACT

An optical system for measuring the range and range-rate between two objects is described. An optical sensor system transmits modulated optical energy and receives energy reflected from an object. The optical sensor system includes a narrow band correlation type receiver and a transmitter which uses a single tone frequency to amplitude modulate a noncoherent continuous wave output. Range is measured as a function of the modulation envelope phase delay of the received signal with respect to the reference transmitted signal by a range tracking loop. A synchronous detector generates a range tracking error signal which is filtered and used to control a time delay of the reference signal input to the synchronous detector. The tracking loop causes the delay introduced into the reference signal to approximate the received signal modulation envelope delay, so a signal proportional to the reference signal delay is used as the range output signal. Range rate is derived by differentiating the range signal.

15 Claims, 3 Drawing Figures

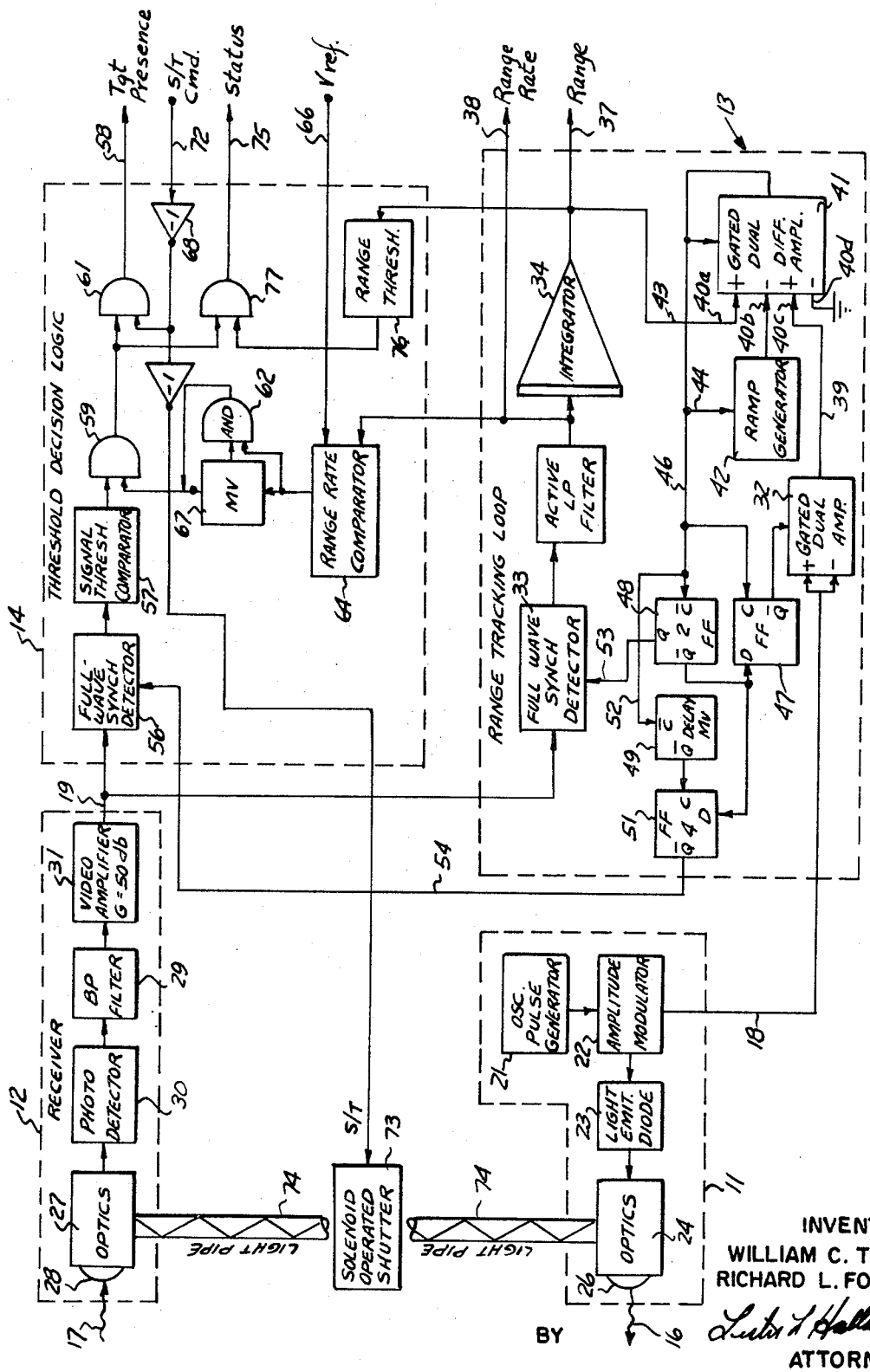

INVENTORS
WILLIAM C. TROLL
RICHARD L. FOWLER
BY
ATTORNEY

OPTICAL RANGE AND RANGE-RATE SENSOR

CROSS-REFERENCE TO RELATED APPLICATIONS

The invention described herein can be used in the system described in application Ser. No. 86,922, entitled "Traffic Responsive Speed Control System," filed Nov. 4, 1970, by J. S. Weidman, H. C. Yee, J. G. Elliott, and Z. Margosian, and assigned to the assignee of the instant application.

BACKGROUND OF THE INVENTION

There are many instances in which it is important to know the range and range rate between two objects. As an example, the adaptive speed control system described in the above-identified application requires the knowledge of the range and range rate which exists between two vehicles so that the following vehicle maintains a minimum safe following distance behind the lead vehicle.

Aircraft traffic on airport runways is another instance in which the knowledge of the range and range rate between vehicles is important. Aircraft moving along runways to approach takeoff runways and taxiing in from approach runways usually require the attention of the air traffic controller and also attention from the pilots of the various aircrafts in order to insure that the aircraft do not collide on the runways. Accordingly, a system which automatically maintains separation between aircraft along runways would alleviate the burden on air traffic controllers and simultaneously relieve the pilot's ground responsibilities so that he can more fully direct his attention to some of the other functions he is required to perform. Furthermore, such a system would greatly add to safety factors along airport runways because the visibility of a pilot, particularly in larger aircraft, is severely limited, and accordingly some smaller aircraft are totally invisible to the pilot.

Another situation where range and range rate are important information is that of aircraft approach during low or zero visibility weather conditions. Under such conditions, the altitude of the aircraft and the approach velocity are extremely important functions, and accordingly a system which accurately derives this information is very important in the aircraft.

The optical tracking of flying aircraft in fair weather is also an instance in which an optical tracking system could be used. Such a usage would be important at night when flying aircraft are virtually invisible and in which regular radar is not desired for one reason or another.

Another potential usage of an optical range and range rate system lies within warehouses and production plants where many in-house vehicles are simultaneously moving about aisles and rows. The efficiency and usefulness of such vehicles can be greatly increased by automatically controlling the vehicles. An optical system could be preferable over a microwave system because the structural materials of a building can interfere with microwaves by causing unwanted reflections much more than they would with optical energy.

It will be appreciated that radar systems can be, and frequently are, used to perform all the above-enumerated functions. However, an optical system would be advantageous over radar systems in many instances. For example, for adaptive speed control system and aircraft usages an optical system would be advantageous because its output would not interfere with the already crowded radar frequency spectrum. Also, highly directive beams are possible with much smaller physical apertures, thereby reducing equipment size. Furthermore, the use of radar systems, as an example — in automobiles, would require the allocation of an operating frequency by the F.C.C. Under current regulations, the use of an optical system would eliminate this requirement.

Although radar has some usages inside a building, these are quite limited because of the internal degradation of the radar signals by the metal objects and structural features of the building. Consequently, an optical system would be very advantageous in such environments.

SUMMARY OF THE INVENTION

The invention is directed to an optical system which is capable of yielding range and range rate between two objects and is useful in any of the environments described hereinabove. The system is operative if the objects are stationary or relatively moving. However, it is primarily described in the usage of an adaptive speed control system for passenger automobiles. The system therefore can be used as the sensor utilized in the system described in application Ser. No. 86,922 fully referenced hereinabove.

The inventive optical range and range-rate sensor includes a transmitter which transmits optical energy of a preselected wavelength. The optical transmitted energy can be in the visible or invisible range, such as infrared or ultraviolet. The output of an oscillator amplitude modulates a light-emitting diode so that the light intensity of the optical output follows the waveform of the oscillator output. The optical energy is then transmitted to an object the range and/or relative velocity of which with respect to the system is desired.

Energy is reflected from the target and the reflected energy is received by a receiver. The reflected light energy is converted into electrical energy in the receiver. The output of the receiver is then utilized in conjunction with a sample of the electrical signal in the transmitter to derive the desired range and range-rate information. A A suitable optical system for transmitting and receiving the optical energy forms a part of the inventive system.

The inventive system includes a range tracking loop having a full-wave synchronous detector and a variable delay. The full-wave synchronous detector receives the output from the amplifier within the receiver, that is, the output representative of the reflected signal modulation, and also a sample of the amplitude modulation signal produced in the transmitting section. The transmitted sample, after passing through the variable delay, serves as an input reference signal to the full-wave synchronous detector. The output of the synchronous detector is integrated, and the integrated output fed back as a control input to the variable delay in a sense to drive the synchronous detector output toward zero. The steady state integrated output is representative of the range between the transmitter and the reflecting object. The synchronous detector output is then the desired range-rate signal. The variable delay system within the range tracking loop is used to vary the delay time of the delay circuit in proportion to the integrated output so that the transmitted reference phase which is injected through the delay into the full-wave synchronous detector causes the output of the detector to approach zero so that the output of the integrator yields the range information.

After amplification, the output of the receiver is also injected into a threshold decision logic circuit. The threshold decision logic circuit contains a full-wave synchronous detector which receives the output from the receiver and measures the amplitude of the reflected signal component. The input reference signal which gates the synchronous detector within the range tracking loop is shifted by 90° and then serves as a gating reference signal to the synchronous detector within the threshold decision logic circuit. The detector output, which is maximized as the range tracking loop detector output minimizes, is then compared in a signal threshold comparator. When a received signal of a level sufficient to exceed the threshold exists, a Target Present signal is generated to indicate that a target is within the sensitivity range of the system.

BRIEF DESCRIPTION OF THE DRAWINGS

FIG. 1 shows a preferred embodiment of the inventive system in block diagram form.

DETAILED DESCRIPTION

Figure 3:
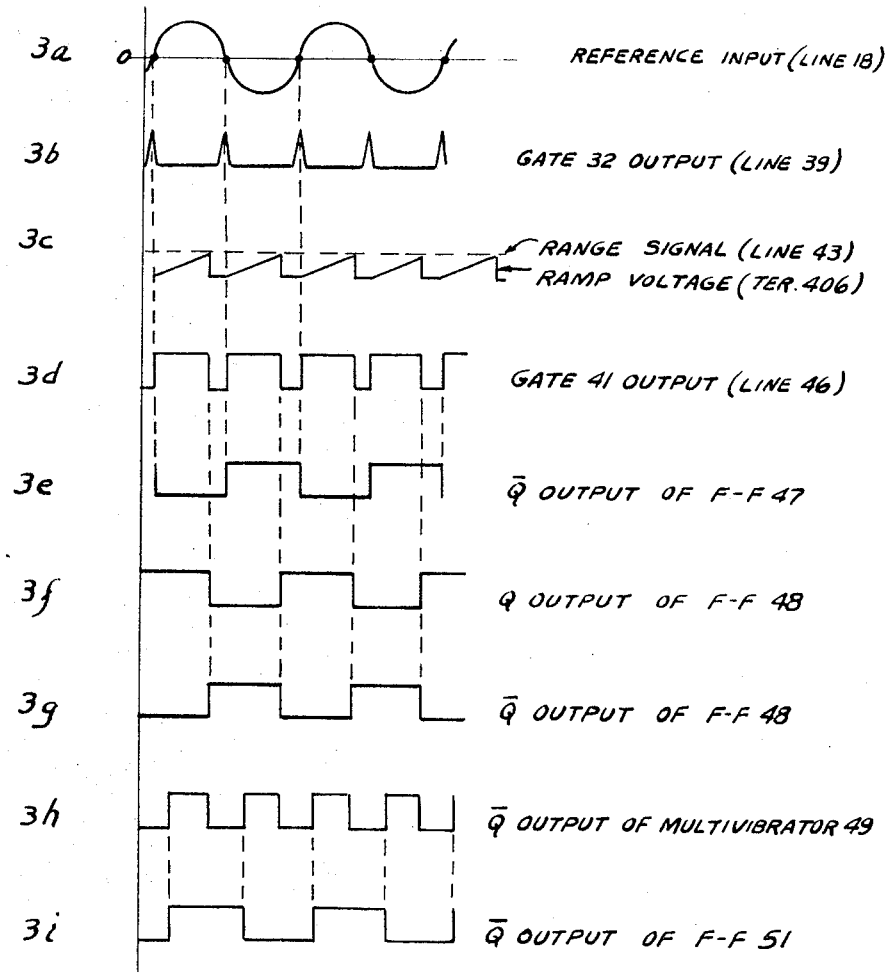
FIG. 3 shows waveforms existing at several locations within the system which are useful in understanding the operation of the system.

The preferred embodiment shown in FIG. 1 includes a Transmitter 11 and a Receiver 12. Transmitter 11 transmits Modulated Electromagnetic Radiation 16 which can be visible or invisible light, or some other form of electromagnetic energy. The transmitted energy is reflected from a target and received back as reflected Energy 17 by Receiver 12. The difference in phase between the transmitted and reflected signals is indicative of the range between the transmitter and the reflecting object. This is true irrespective of whether or not there is a relative velocity between the transmitter and the object.

A Range Tracking Loop 13 contained within the system receives the transmitted modulation waveform by way of a Line 18 as well as the received modulation waveform by way of Line 19. A phase comparison of these two signals yields an indication of the range between the Transmitter 11 and the object reflecting the energy. This is so because the propagation delay of the reflected energy causes an envelope phase shift in accordance with the relationship:

$$\Delta\phi = (4 \pi f R/C)$$

where:

$\Delta\phi$ = the phase shift in radians
R = range in feet
f = modulation frequency in hertz
C = velocity of light in feet/second The range information is then used to derive the range-rate information which is indicative of the relative velocity between the transmitter and the reflecting object.

Transmitter Section 11 includes a Pulse Generator 21, the output of which drives a ringing-type Modulator 22. The amplitude modulator signal is converted to light signals in a Light-Emitting Diode 23. The application of the amplitude modulated signal to Diode 23 causes the intensity of the light emitted by Diode 23 to vary in accordance with the modulation waveform of the driving signal. The output from Light-Emitting Diode 23 is directed to an Optical System 24 which then transmits the light energy by way of a Lens 26. Optical System 24 and Lens 26 are standard elements selected to give the desired beam pattern.

The output of Modulator 22 is directed to Range Tracking Loop 13 over Line 18. The signal voltage present on Line 18 can be made to be virtually 90° out of phase with the current through the Diode 23 when this voltage and current, respectively, represent the voltage across and current through a series coil (not shown) in the modulator.

A 90° phase shift of the reference signal is used because this signal, after processing, is used to gate Synchronous Detector 33. The reflected signal is also received by Detector 33, and therefore with a 90° phase shift the detector output approaches zero as the range tracking error approaches zero. This allows an advantageous range tracking loop operation in which the range and range rate are measured essentially independently of received signal level within the sensitivity range of the system.

Reflected energy is received by Optical System 27 via Lens 28. These elements are of a standard type. Optical System 27 directs the received energy to a Photodetector 30 which converts the optical energy into electrical signals. Photodetector 28 can be a photodiode if desired. A Band-Pass Filter 29 receives the output of the Photodetector 28 and is used to tune out diode capacity and reduce diode noise. The electrical output of Receiver Section 12 is presented on Output Lead 19 and is directed to Threshold Decision Circuit 14 and Range Tracking Loop 13.

Range Tracking Loop 13 also receives the amplitude modulation signal from Modulator 22 by way of Input Lead 18. This signal is directed to a dual-input Gated Amplifier 32. By the use of appropriate processing in a manner more fully described hereinafter, the output of Gated Amplifier 32 is used in the production of a reference signal which has a phase delay with respect to the modulation signal from Modulator 22 and which is proportional to the Range Output Signal 37. The reference signal is supplied to Full-Wave Synchronous Detector 33 on Line 53. One input to Detector 33 is therefore derived from the sampled modulation signal from Modulator 22.

Detector 33 also receives the output representative of the reflected signal from Receiver 12. The output of Detector 33 therefore is a signal which is representative of the difference in phase between the reference signal derived from Transmitter 11 and a reflected signal received from Receiver 12, and accordingly is indicative of the range error existing between the Range Output Signal 37 and the target reflecting the signal.

Figure 2:
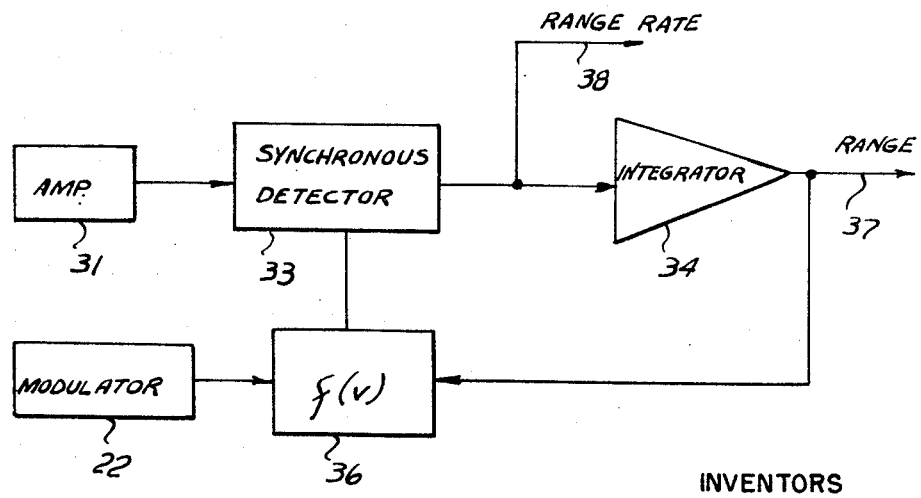
FIG. 2 is a simplified block diagram showing how the range and range-rate signals are derived.

The manner of obtaining the range and range-rate information from Synchronous Detector 33 can be more readily understood by reference to FIG. 2, which is a simplified showing of a circuit for obtaining these signals in the manner used in the inventive system. In FIG. 2, Amplifier 31 contained in Receiver 12 and Synchronous Detector 33 contained within Range Tracking Loop 13 are represented by the same reference numerals used in FIG. 1. The system also includes an Integrator 34, the output of which is fed back as a bias control signal to Circuit 36, the output of which is a time delayed version of the input voltage from Modulator 22. Accordingly, Circuit 36 is in effect a voltage-variable time delay circuit the output of which represents the signal received from the delay circuitry contained within Range Tracking Loop 13. Amplifier 31 injects an input into Synchronous Detector 33 when a reflected signal is present from Receiver 12. At the same time a reference signal is being injected into Synchronous Detector 33 from Circuit 36 because of the reference input received from Modulator 22 in Transmitter 11. Accordingly, the output of Synchronous Detector 33 is a DC signal which is dependent upon the difference in phase between the two input signals and ordinarily would be a range error signal. This signal is integrated in Integrator 34, the output of which is fed back to Circuit 36. Circuit 36 operates so that its input-output delay varies linearly with the bias voltage level established by the output of Integrator 34. Accordingly, the phase relationship between the two inputs to Synchronous Detector 33 tend to drive its output to zero. For full-wave operation, Detector 33 can include a gated dual differential amplifier having both input pairs driven 180 degrees with respect to one another. The output of Detector 33 goes to zero when the signal and reference inputs are applied in phase quadrature. Therefore, when this quadrature condition is approached, the output voltage of Integrator 34 reaches steady state and represents target range. The input to Integrator 34 is proportional to the derivative of the range signal and accordingly will be the desired range-rate signal. When lock-on has occurred, the output of Integrator 34 remains constant so long as the range remains constant. If the range changes, the change is reflected in signals received from Receiver 12 so that an appropriate change is made in the Tracking Loop 13.

Referring again to FIG. 1, the reference phase signal from Modulator 22 is injected into a gated dual Amplifier 32. Amplifier 32 serves as a zero crossing detector so that its output is a series of positive pulses which occur at the zero crossings of the input signal. FIG. 3b shows a waveform of this type. Positive spikes are received at the negative-going zero crossing because Amplifier 32 has inverted dual inputs gated every half-cycle. Amplifier 32 also receives an input from D-type Flip-Flop 47. This input resets Gate 32 at the appropriate time in a manner controlled by the output Gated Dual Differential Amplifier 41 in a manner fully described in the "Range Loop Operation" section hereinafter. Amplifier 32 is of known type, and several are presently available.

The output of Amplifier 32 is presented over Line 39 to a non-inverting input Terminal 40c of Gated Dual Differential Amplifier 41. Gated Amplifier 41 has four Input Terminals 40a to 40d. Terminals 40a and 40b form one pair, and Terminals 40c and 40d another pair. Terminal 40a receives the Range Signal from Integrator 34 and Terminal 40b is energized by the output of a Ramp Generator 42. When the Range Signal exceeds the ramp voltage, terminals 40a and 40b control the output of Amplifier 41 so that the output is high (i.e., a logic one). When the ramp voltage equals the Range Signal terminal pair 40a–40b results in a low output (i.e., a logic zero) from Amplifier 41. This condition resets Ramp Generator 42 and persists until a pulse from Gate 32 is received on Terminal 40c, at which time the output of Amplifier 41 again goes high.

The high output of Amplifier 41 starts Ramp Generator 42. The ramp voltage therefore is again applied to Terminal 40b and the output of Amplifier 41 remains high until the ramp equals the Range Signal, at which time the output goes low and the cycle repeats. FIG. 3d shows a waveform of the type Amplifier 41 presents to Line 46. The correlation of the rise and fall sides of the FIG. 3d waveform with FIGS. 3b and 3c, respectively, is apparent from the Figures. The pulse width of the output waveform from Amplifier 41 is dependent upon the level of the Range Signal from Integrator 34. This dependency is apparent from FIGS. 3c and 3d. The signal present on Line 46 remains high and constant until the Ramp of FIG. 3c reaches the Range Signal level, at which time it goes low. Therefore, the pulse width of waveform 3d will increase and decrease, respectively with increases and decreases in the level of the Range Signal.

The output of Gated Amplifier 41 is directed by Line 46 to a D-type Flip-Flop 47 and a toggled Flip-Flop 48. The operation of D-type Flip-Flop 47 is such that an input on Terminal D results in an inverted output on Terminal $\bar{Q}$ when triggered by a positive-going transition on Terminal C. Therefore, the $\bar{Q}$ output remains the same until the signal present on Terminal C changes from low (i.e., logic zero) to high (i.e., logic one). This is evident from FIGS. 3d and 3e. FIG. 3e shows the $\bar{Q}$ output of Flip-Flop 47 to be constant and changes only when the signal of FIG. 3d, the signal on Terminal C of Flip-Flop 47, changes from low to high.

The toggled Flip-Flop 48 operates such that its Q and $\bar{Q}$ outputs change state whenever the signal present on the $\bar{C}$ Input Terminal changes from high to low. That is, the output which was previously high becomes low and the other output, which was low, becomes high. This is evident from FIGS. 3d and 3f. Outputs Q and $\bar{Q}$ of Flip-Flop 48 are oppositely poled in all instances. This can be understood by referring to FIGS. 3f and 3g which, respectively, show the Q and $\bar{Q}$ outputs. By reversing all the rise and fall sides of the Q output shown in FIG. 3f, the $\bar{Q}$ output shown in FIG. 3g is obtained.

The Q output of Flip-Flop 48 is directed over Line 53 to Synchronous Detector 33. This output therefore gates Detector 33 in accordance with the level of the range signal obtained from Integrator 34; this is more fully explained hereinafter in the "Range Loop Operation" section.

A Delay Multivibrator 49 receives the output from Amplifier 41. The $\bar{Q}$ output of Delay 49 is coupled to the C Terminal of D-type Flip-Flop 51. Flip-Flop 51 operates in the same manner as Flip-Flop 47. The D Terminal of Flip-Flop 51 is coupled to the $\bar{Q}$ Terminal of Flip-Fop 48. FIGS. 3g and 3h show the waveforms which control Flip-Flop 51 so that it yields the waveform shown in FIG. 3i as an output. FIG. 3i shows that the $\bar{Q}$ output of Flip-Flop 51 changes each time the $\bar{Q}$ output of Multivibrator 49 goes from low to high. Synchronous Detector 56 receives the output of Flip-Flop 51 as a reference gating signal. Because of Delay 49 the reference gating signal to Detector 56 is phase shifted by 90° from the reference gating signal to Detector 33. Delay Multivibrator 49 determines the delay, which is substantially constant.

RANGE LOOP OPERATION

Because of the interconnection of the circuits within Range Tracking Loop 13, the operation of the loop can be understood only by first assigning some existing conditions and following the operation through from the assigned conditions. Accordingly, it is first assumed that Ramp Generator 42 is running, but the ramp voltage on Terminal 40b of Amplifier 41 is below the Range Signal on Terminal 40a. In this condition the output of Gated Amplifier 41 is controlled by Terminal Pair 40a and 40b, so that the output on Lead 46 is high. Consequently, the C Input of Flip-Flop 47 and the $\overline{C}$ Input of Flip-Flop 48 each receive a high input.

FIG. 3e shows that the $\overline{Q}$ output of Flip-Flop 47 is low at this time. The Q output of Flip-Flop 48 is shown to be high during the same time interval by FIG. 3f. The Range Signal present at the output of Integrator 34 is coupled to Terminal 40a of Gated Amplifier 41. The output of Amplifier 41 and therefore of Flip-Fop 48 is therefore dependent upon the Range Signal. Because Detector 33 also receives the signal representative of the reflected energy, the loop locks onto the correct range through the interconnection of signals described.

When the ramp voltage reaches the Range Signal level, the output of Gated Amplifier 41 goes to zero and the ramp is cut off. Referring again to FIGS. 3d, 3e, and 3f, it is noted that the $\overline{Q}$ output of Flip-Flop 47 remains unchanged while the Q output of Flip-Flop 48 changes state, going to zero in the case of the first transition shown. This output remains zero until the signal on Line 46 again changes from high to low.

Ramp Generator 42 remains off and the output of Amplifier 41 remains low and controlled by Terminal Pair 40c and 40d, until a pulse is received from Gated Amplifier 32, This occurs at the next zero crossing of the reference signal. Upon the reception of a pulse from Amplifier 32, Amplifier 41 yields a high output which connects Terminal Pair 40a and 40b and starts Ramp Generator 42. The output of Amplifier 41 remains high until the ramp voltage equals the Range Signal, at which time the cycle is repeated.

When the ramp shut down and the output of Amplifier 41 went low, a low input was placed on the C Input of Flip-Flop 47 and the $\overline{C}$ Input of Flip-Flop 48. The change from high to low on Line 46 caused a change in Q and $\overline{Q}$ of Flip-Flop 48, but caused no change in Flip-Flop 47 outputs. However, when the pulse from Gated Amplifier 32 turned the output of Gated Amplifier 41 high, a change occurred in the $\overline{Q}$ Output Flip-Flop 47, but no change occurred in the outputs of Flip-Flop 48. This can be seen by considering FIGS. 3b, 3d, 3e, and 3f. The change of $\overline{Q}$ Output of Flip-Flop 47 resets Gated Amplifier 32 so that it continues to yield positive pulses at all of the zero crossings of the reference signal. The transitions in Flip-Flop 47 $\overline{Q}$ output closely follow the zero crossings in the modulation reference Signal 18 (delayed only by circuit propagation time), and therefore the output of Gated Amplifier 32 is pulsed. The width of the pulses is governed by the inherent circuit progagation delay.

The series of changes thus far described causes the outputs of Flip-Flop 48 to be dependent upon the level of the Range Signal and tied to the zero crossings of reference signal input on Line 18. Specifically, the transitions in the output of Flip-Flop 48 occur following the zero crossings of the reference input signal on Line 18 by a time delay proportional to the Range Signal. The output of Flip-Flop 47 is dependent upon the zero crossings of the reference signal.

The effects of the changes on Flip-Flop 51 must also be considered. Flip-Flop 51 is a D-type Flip-Flop which operates in the same manner as Flip-Flop 47. Therefore, a change in the $\overline{Q}$ Output occurs only when the C Input changes from low to high. The C Input is coupled to the $\overline{Q}$ Output of a Delay Multivibrator 49. Line 46 is coupled to the $\overline{C}$ Input of Delay 49 so the $\overline{Q}$ Output changes from high to low each time the output of Gated Amplifier 41 changes from high to low. The changes in the $\overline{Q}$ Output of Delay Multivibrator 49 are therefore controlled by Gated Amplifier 41 and also by the normal operational characteristics of the multivibrator. FIG. 3h shows the output of Delay Multivibrator 49.

Flip-Flop 51 is a D-type Flip-Flop, and therefore its $\overline{Q}$ Output changes each time its C Input goes from low to high, as shown by FIGS. 3h and 3i. The $\overline{Q}$ Output of Flip-Flop 51 therefore has a delayed phase relationship with respect to the Q Output of Flip-Flop 48. The delay is determined by Delay Multivibrator 49.

THRESHOLD DECISION LOGIC

The output of Flip-Flop 51 is directed by Lead 54 to the input of Full-Wave Synchronous Detector 56 contained within the Threshold Decision Logic 14. Because the reference phase signal has been delayed by an amount proportional to range and because it has been shifted by an additional 90 degrees before being injected into Synchronous Detector 56, the two inputs to Detector 56 combine to yield a maximized output voltage. This signal is applied to a Threshold Gate 57 so that when the output from Detector 56 is above the threshold level, a Target Present Signal is presented on Output Terminal 58. A Target Present Signal cannot be generated when a Self-Test Signal is present or when an excessive Range Rate is present. The output from Threshold Circuit 57 is directed to Output Terminal 58 through two AND Gates 59 and 61. These AND Gates prevent a Target Present Signal during the above-stated conditions. Threshold Circuit 57 is intended to prevent target present signals from being generated when signals are received from targets considered out of the sensitivity range of the system. The threshold level set into the circuit will be a function of the tolerable range and range-rate noise in a particular application, which define the useful sensitivity range of the system. Threshold Decision Logic Circuit 14 further requires that Range Tracking Loop 13 be stabilized before a Target Present indication is obtained from the system. Accordingly, the target present signal indicates when the range and range-rate output signals represent valid measurements of target characteristics.

If the inventive system is used in an adaptive speed control system of the type mentioned in the above-identified application, Ser. No. 86,922, or a similar type of system, range rate can also be checked in a range-rate Comparator 64. Comparator 64 can receive an analog reference voltage derived from the vehicle speedometer cable and also the range-rate output from Synchronous Detector 33. Inputs to range-rate Comparator 64 from Detector 33 which are excessively high or low with respect to the reference velocity Input 66 indicate either that tracking loop lock-up has not been achieved or the presence of targets having velocities other than those of interest. Range-rate Comparator 64 can therefore be used to achieve fixed target rejection so that such targets cannot interfere with the desired operation of the system.

The output from range-rate Comparator 64 is directed to a one-shot Multivibrator 67, which in turn inhibits AND Gate 62 during its astable period. AND 62 is also actuated directly from the output of Comparator 64. Therefore, one-shot Multivibrator 67 delays the actuation of AND 62 for a time delay sufficient to assure that the Range Tracking Loop is locked. After AND 62 is actuated its output supplies a logic one signal to AND 59 so that a Target Present Signal can be passed to Output Terminal 58.

The system also includes a self-test mechanism wherein an externally applied voltage is used to initiate testing of the operability of the system. The self-test decision can therefore be applied either manually or periodically automatically by an external control circuit. The Self-Test Command Signal is the input to Inverter 68, the output of which is directed to AND 61 to prevent the generation of a Target Present Signal during the Self-Test Command. When a Self-Test Signal is present it is inverted to a zero by Inverter 68, and AND 61 is nonconductive so that a Target Present Signal cannot be passed to Terminal 58.

After additional inversion in Inverter 69, the Self-Test Signal is directed to a solenoid-operated Shutter 73 contained within the optical system. Upon actuation of the Shutter 73, a Light-Conducting Rod 74 directs light from the Transmitting Optical System 24 to the Receiving Optical System 27. This appears as a target signal to the Receiver 12, and accordingly the Self-Test Signal is processed in such a manner. However, there is no phase shift between the apparent zero-range received signal and the transmitted modulation signal, and therefore steady-state range and range-rate values of zero are generated in the properly functioning system. To check this characteristic, the system contains a Range Threshold Circuit 76, the output of which actuates AND Gate 77 which generates the signal on Status Output Terminal 75. AND Gate 77 also receives an input from AND 59 which is in the Target Present Signal generating chain. Range Threshold Circuit 76 receives the range output from Integrator 34 as an input and compares it against a fixed value defining the tolerable acceptance range. Accordingly, when AND Gate 77 receives a high level signal from both Range Threshold 76 and AND Gate 59 indicating a proper system response to a self-test signal, it generates a logic one output so that Output Lead 75 indicates a high level status output showing the system is operative. If either input to AND Gate 77 is low, it generates a logic zero output, and the status signal is no longer present on Output Terminal 75.

What is claimed is:

1. An optical system for determining the range and relative velocity between two objects comprising:
    transmitting means for generating an initial signal and transmitting said initial signal as optical energy;
    receiving means for receiving said optical energy as reflected energy after the reflection thereof from one of said objects and generating a reflected signal, said reflected energy being time delayed with respect to said transmitted energy by an amount proportional to the distance between said objects;
    means for producing range proportional signals and relative velocity proportional signals, said means for producing including first signal combining means, said first signal combining means receiving said reflected signal and a portion of said initial signal, the output of said signal combining means being dependent upon said time delay and thereby useful in producing said range proportional signal and said relative velocity proportional signal;
    delay means interposed between said transmitting means and said first signal combining means, said delay means delaying said initial signal by an amount proportional to said distance so that the output of said first signal combining means is said relative velocity signal;
    said delay means including gate means, and voltage responsive function generator means, said gate means receiving the output of said function generator and said initial signal so that said initial signal is injected into said first signal combining means as a modified signal.

2. The system of claim 1 wherein said means for producing includes integration means for integrating said relative velocity signal to produce said range signal.

3. The system of claim 1 wherein said function generator is controlled by the output of said gate and said gate also receives said range signal so that the output of said gate is dependent upon said range signal.

4. The system of claim 3 wherein said modified signal is injected into said first signal combining means through a phase shift network.

5. The system of claim 4 further including integrator means responsive to said first signal combining means and wherein said delayed initial signal varies in accordance with said range output to force the output of said first signal combining means toward zero so that the output of said integrator indicates the range between said objects.

6. The system of claim 1 further including threshold means for producing a target present signal when said received signal is above a predetermined threshold level, said threshold means being responsive to the output of threshold gate means, said threshold gate means receiving said received signal and said delayed initial signal.

7. The system of claim 6 further including means for applying a self-test signal to said system to thereby test the operability of said system.

8. The system of claim 5 wherein said function generator is a ramp generator which generates a new ramp each half cycle of said initial signal.

9. The system of claim 8 further including a zero crossing detector interposed between said transmitting means and said gate means.

10. The system of claim 9 wherein said signal combining means is a synchronous detector and said gate means is a gated dual differential amplifier.

11. An optical system for determining the range and relative velocity between two relatively moving objects comprising:
    transmitting means for generating an initial signal and transmitting said initial signal as optical energy;
    receiving means for receiving said optical energy as reflected energy after the reflection thereof from one of said objects and generating a reflected signal; said reflected energy being phase shifted with respect to said transmitted energy by an amount proportional to the distance between said objects;

means for producing a range proportional signal and a relative velocity proportional signal, said means for producing including;

signal combining means, said signal combining means receiving said reflected signal, voltage responsive control signal generating means receiving said initial signal, said signal combining means also receiving said control signal to thereby generate said relative velocity proportional signal, integrator means receiving said relative velocity proportional signal and generating said range proportional signal, said voltage responsive control signal generating means also receiving said range proportional signal so that said control signal is proportional to said range proportional signal.

12. The system of claim 11 wherein said voltage responsive generating means includes:

function generator means;

first gate means receiving said range proportional signal and the output of said function generator producing a gated signal;

said function generator being responsive to said gated signal;

and first switching means receiving said gated signal and actuating said signal combining means.

13. The system of claim 12 further including pulse generator means receiving said initial signal and actuating said first gate means to periodically restart said function generator in accordance with said initial signal.

14. The system of claim 13 further including second switching means actuated by said first switching means and said gated signal and coupled to said pulse generator means for resetting said pulse generator in accordance with said gated signal.

15. The system of claim 14 wherein said function generator is a ramp generator, the output of which cannot exceed said range proportional signal;

said pulse generator is zero crossing detector which generates pulses of like polarity for all zero crossings.

* * * * *